United States Patent
Duval et al.

[11] Patent Number: 5,261,077
[45] Date of Patent: Nov. 9, 1993

[54] CONFIGURABLE DATA PATH ARRANGEMENT FOR RESOLVING DATA TYPE INCOMPATIBILITY

[75] Inventors: James R. Duval, Shrewsbury, Mass.; Thomas E. Hunt, Brookline, N.H.; Kevin R. Peterson, Stow, Mass.

[73] Assignee: Digital Equipment Corporation, Maynard, Mass.

[21] Appl. No.: 546,507

[22] Filed: Jun. 29, 1990

[51] Int. Cl.⁵ .................. G06F 15/16; G06F 7/00; G06F 13/00
[52] U.S. Cl. .................. 395/500; 364/927.93; 364/240.3
[58] Field of Search ............... 364/DIG. 1, DIG. 2; 395/500

[56] References Cited

U.S. PATENT DOCUMENTS

| | | | |
|---|---|---|---|
| 4,365,295 | 12/1982 | Katzman et al. | 364/200 |
| 4,447,878 | 5/1984 | Kinnie et al. | 364/200 |
| 4,878,197 | 10/1989 | Nay et al. | 364/900 |
| 5,063,494 | 11/1991 | Davidowski | 364/DIG. 1 |

*Primary Examiner*—David Y. Eng
*Attorney, Agent, or Firm*—Cesari and McKenna

[57] ABSTRACT

Apparatus for sharing data between processors having certain incompatible data formats is provided. A configurable data path unit and an address mapping unit allow a peripheral processor to access addressable storage locations within a host processor's main memory and store data types in a format so that the both processors can correctly access and interpret the data.

7 Claims, 3 Drawing Sheets

CONFIGURABLE DATA PATH ARRANGEMENT FOR RESOLVING DATA TYPE INCOMPATIBILITY

FIELD OF THE INVENTION

This invention relates generally to data processing systems and more specifically, to a method and apparatus for resolving data type format incompatibility between two different types of processors.

BACKGROUND OF THE INVENTION

In data processing systems, a bus is commonly employed to interconnect various elements of the system. The bus is typically configured to optimize the performance of the data processing system. For example, a processor is connected to a main memory via a bus capable of carrying signals associated with the operation of each element. These signals include address, data and control signals of a type and quantity specific to the architecture of the processor.

As data processing systems achieve increasingly higher levels of performance, it is sometimes desirable to provide more than one processor and bus in the system. For example, it may be desired to provide a local bus which interconnects a host processor and a main memory, and to provide a remote bus which connects the local bus with an "intelligent" peripheral, such as a processor-based input/output controller. The peripheral processor may be of a different architecture from the host processor, thereby requiring a remote bus capable of carrying signals of a type and quantity different from those of the local bus.

In such multiple processor systems, it is essential to transfer signals between the local and remote buses, and to store, access and correctly interpret the signals, including data shared between them. In general, this requires a bus adapter that is connected to both buses and operates on each according to the characteristics of that bus. For example, the adapter must be able to receive data from a peripheral processor and transfer the data to memory locations addressable by the host processor. The host processor must then be able to access and correctly interpret the stored data.

A problem arises when the processors store and interpret particular data types in different formats. For character data types, all processors capable of interpreting ASCII character string formats store the data in a similar manner. However, there is a fundamental incompatibility in the way some processors store and interpret integer data types. For example, some processors store integer data in a format such that the least significant byte is interpreted at position in a 32-bit longword completely opposite that of other processors. That is, other processors interpret the byte in the same position as the most significant byte.

Prior attempts to resolve data type incompatibility between a peripheral processor sharing data with a host processor require software intervention to determine the data type and, if it was an integer data type, to direct the host processor to rearrange the data. Such a procedure resulted in data processing system performance degradation.

Therefore, in accordance with an aspect of the present invention, an object is to provide an apparatus for sharing data between processors having certain incompatible data formats.

Additionally, an object of the present invention is to provide a configurable data path between processors having certain incompatible data formats.

In accordance with another aspect of the invention, an object is to provide a programmable apparatus for configuring the data path between processors having certain incompatible data formats.

SUMMARY OF THE INVENTION

The foregoing and other features of the invention are accomplished by providing a method and apparatus for storing data of a particular type in a format that allows different processors to access and interpret the data type correctly. In general, a configurable data path unit and an address mapping unit comprise a hardware arrangement that allows a peripheral processor to access addressable storage locations within a host processor's main memory and store data types in a format so that both processors can interpret the data correctly.

Specifically, an address issued by the peripheral processor on a remote bus, referred to as a "remote" address, is presented to a mode register unit located in a bus adapter that links the remote bus with a local bus. The remote address specifies a programmable mode register in the adapter. The mode register includes a plurality of fields, a first field of which contains information about the type of data to be stored in the main memory. This information, together with other control signals, is provided to a data path unit, which configures data lines connecting the remote bus to the local bus and thereby shifts and swaps the data to reformat it, if necessary. The data transferred by the peripheral processor to the main memory via the adapter is thus stored in a format that allows either processor to correctly interpret it. The other field of the programmable mode register is used, in conjunction with the remote address, to generate an address in main memory addressable by the host processor, referred to as a "local" address.

An advantage of this arrangement is an increase in the overall performance of the data processing system since the hardware arrangement reduces the extent of software involvement in the disposition of incompatible data.

Other objects, features and advantages of the invention will become apparent from a reading of the specification when taken in conjunction with the drawings in which like reference numerals refer to like elements in the several views.

DETAILED DESCRIPTION OF ILLUSTRATIVE EMBODIMENTS

Figure 1:
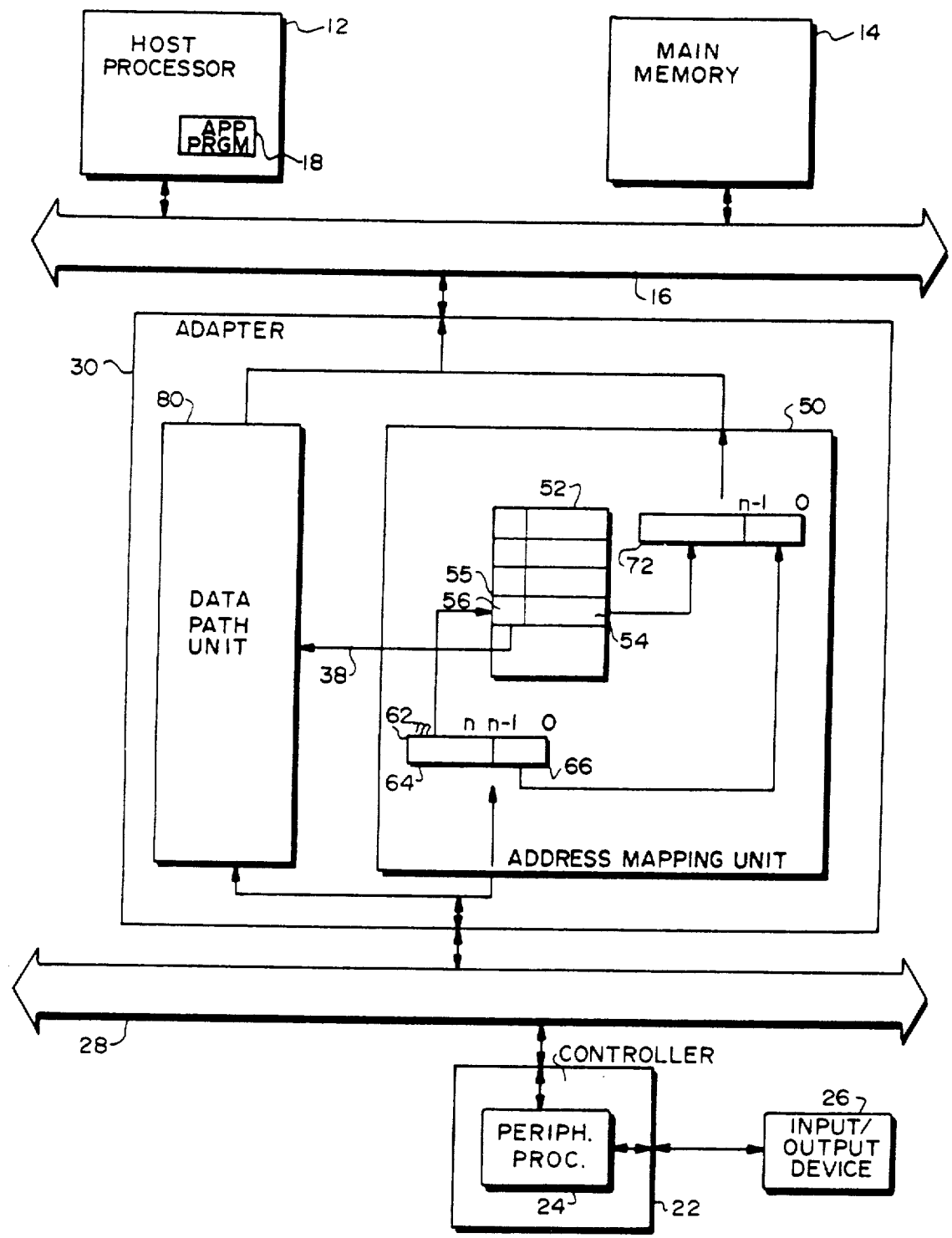
FIG. 1 is a block diagram of a data processing system including a data path unit and address mapping unit according to the invention.

Referring to the drawings and particularly to FIG. 1, a data processing system 10 includes a host processor 12 and a main memory 14 interconnected by a local bus 16. A peripheral controller 22 is coupled to a remote bus 28, the controller 22 being configured for operation with an input/output device 26 such as a disk drive. The controller 22 includes a peripheral processor 24 for controlling the operation of input device 26 and transferring data from the device 26 to the shared main memory 14.

In data processing system 10, the peripheral processor 24 has a different architecture from that of the host processor 12. For example, the number of storage locations that can be directly addressed by the peripheral processor 24 (remote address space) is different from that of the host processor 12 (local address space). Also, the format and order in which data is stored at the addressable locations differ between the processors, depending upon the data type. ASCII character strings are stored in a consistent format. However, as noted, different processors store integer data types differently, with the actual format and order of the data depending upon whether the unit to be stored is an 8-bit byte, a 2-byte word, or a 4-byte longword. The order of the data is typically determined on a byte basis, that is, the order of bits within the 8-bit byte is fixed, but the order of bytes within a 4-byte longword varies. Nevertheless, it is essential that processors be able to store, access and correctly interpret the data bytes shared between them.

An adapter 30 transfers data bytes between the peripheral processor 24 and main memory 14. Specifically, the adapter 30 interconnects the remote bus 28 and the local bus 16, and is configured to operate on each according to the characteristics of each bus. The remote bus 28 is configured to carry address, data and control signals associated with the operation of the peripheral processor 24. The control signals identify both the type of operation requested by the processor 24 (read/write) and the data bytes involved in the operation (byte-mask). The address identifies a location 14 where the operation is to take place. The adapter 30 receives data bytes from the remote bus 28 in a format particular to the processor 24, and transfers the data bytes to main memory 14 in a format that allows the host processor 14 to correctly interpret the stored data.

Figure 2:
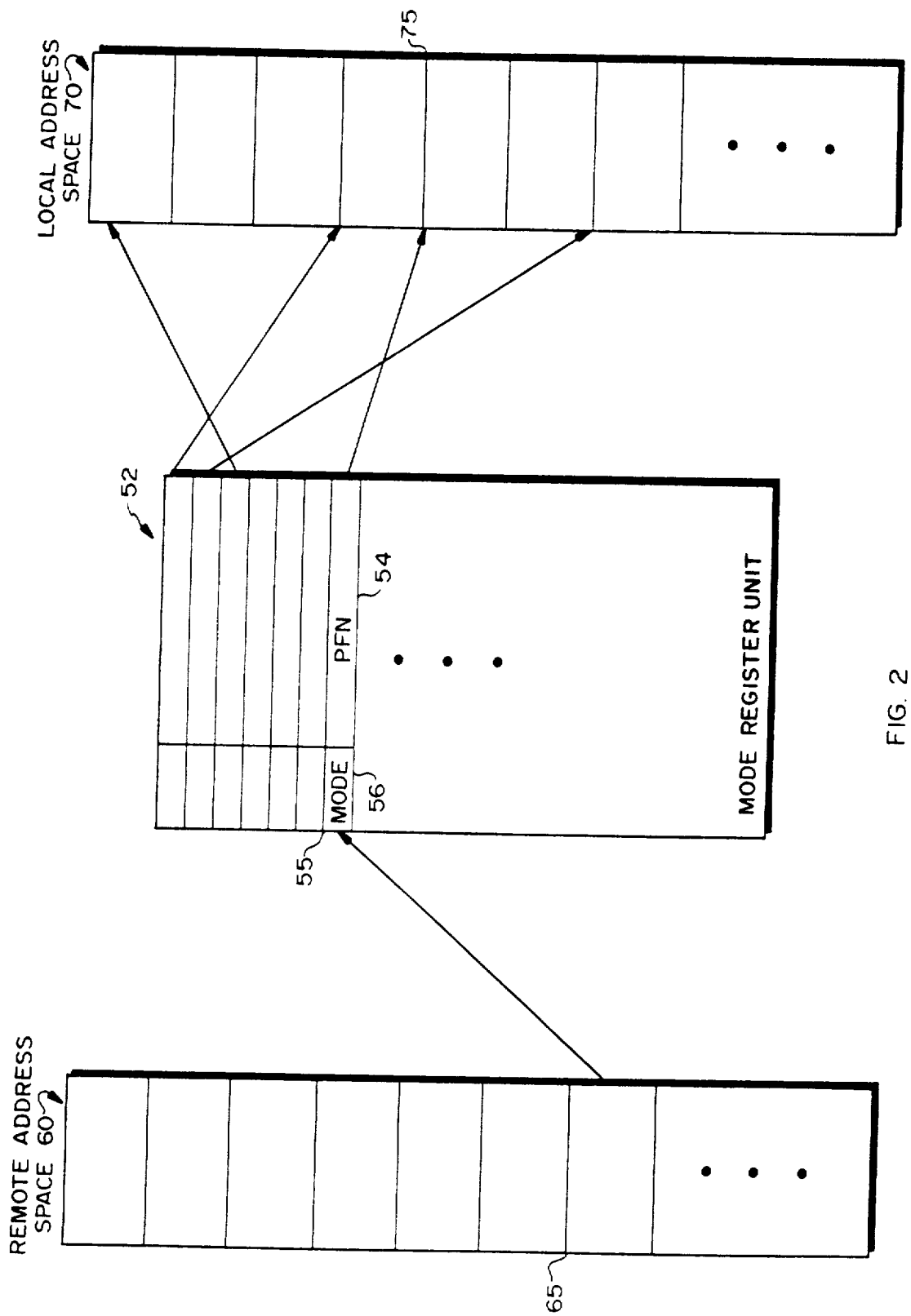
FIG. 2 is a block diagram of a mode register unit in accordance with the invention.

In accordance with the teachings of the invention, the adapter 30 includes an address mapping unit 50 and a data path unit 80. The address mapping unit 50 translates an address issued by the peripheral processor 24 (remote bus address) into a location in shared memory 14 addressable by the host processor 12 (local bus address) using a mode register unit 52. FIG. 2 illustrates the function of the mode register unit 52. A remote address space 60 for peripheral processor 24 and a local address space 70 for host processor 12 are divided into blocks or pages having the same number of addressable locations per page. The mode register unit 52 includes a set of programmable mode registers 55 each of which contains information that points to a starting location of a page 75 in the local address space 70. Each page 65 of addresses in the remote address space 60 corresponds to a programmable mode register 55, with the number of registers 55 in the register unit 52 preferably equaling the number of pages 65 in the remote address space 60.

The contents of each programmable mode register 55 comprise two fields received from the data processing system 10. Field 54, referred to as the page frame number (PFN) field, contains information that points to the first address of a page 75 in the local address space 70. This field translates a remote address into a local address in shared memory 14 using bits common to both addresses. As shown in FIG. 2, the PFN fields 54 contained in registers 55 point to pages 75 scattered throughout the local address space 70. Typically, the operating system allocates the programmable registers 5 and provides the contents of the PFN fields 54.

A MODE field 56 contains information used for configuring the data path unit 80 (FIG. 1). The contents of the MODE field 56 may vary among programmable mode registers 55. That is, an application program 18 (FIG. 1), which runs in the host processor 12, directs the setting of the bits in the MODE field 56 depending upon the data types transferred from the peripheral processor 24 into the main memory 14. The contents of field 56 are then provided to the data path unit 80 as control signals.

Figure 3:
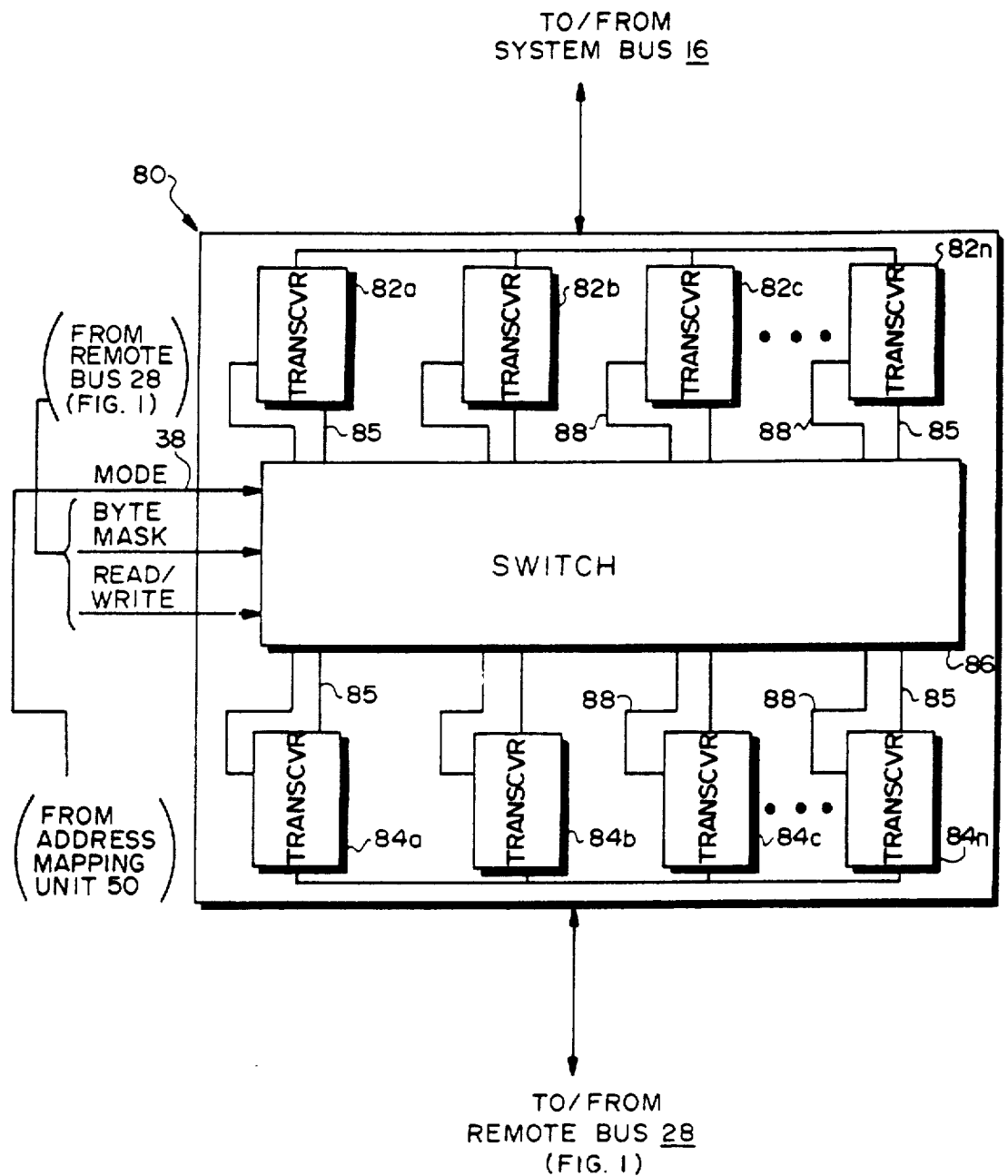
FIG. 3 is a block diagram of the data path unit in accordance with the invention.

FIG. 3 is a block diagram of the data path unit 80. The data path unit 80 includes devices for connecting data lines in the adapter 30 to respective remote bus 28 and local bus 16 data lines. A first set of transceivers 82a-n coupled to the local bus 16 and a second set of transceivers 84a-n are coupled to the remote bus 28. Each transceiver is capable of transmitting or receiving a parallel byte of data. Each of the transceivers 82a-n may be connected to any one of the transceivers 84a-n via a plurality of data lines 85 located within a switch 86, depending upon the data configuration desired. The switch 86 thus connects the remote bus 28 to the local bus 16.

The switch 86 receives three sets of control signals used to configure the data path unit 80: Mode signals from the MODE field 56 in programmable mode register 55, byte-mask signals and a read/write signal. The Mode signals are provided by the address mapping unit 80 over line 38, while the byte-mask signals and read/write signal are provided by the peripheral processor 24 over remote bus 28.

As mentioned, the Mode signals from MODE field 56 contain information about the type of data to be stored at the local address in main memory 14. The byte-mask signals identify which bytes contain valid data and require reordering in connection with the Mode signals. The read/write signal identifies the direction of transfer within the adapter 30. The Mode, byte-mask, and read/write control signals enable certain transceivers over a plurality of control lines 88 connected to each transceiver within the data path unit 80 to establish a configuration of data lines 85 within the switch 86 for swapping and shifting appropriate data bytes received in a particular format from the remote bus 28 to a format capable of interpretation by the host processor 12. These control signals specify the configuration of the data path on a transaction-by-transaction basis within the application program; thus, the data path is configurable based on the needs of each inter-bus data transfer.

With reference to FIGS. 1, 2 and 3, the address translation and data path configuration operations of adapter 30 will now be described. A remote address 62 is issued by the peripheral processor 24 on the remote bus 28. The remote address 62 is presented to the address mapping unit 50 of adapter 30 where it is parsed into two fields. A field 64 containing the higher order address bits $<m:n>$ specifies a programmable mode register 55 in the register unit 52. The PFN field 54 of the register 55 is concatenated to a field 66 of remote address 62 containing lower order address bits $<n-1:0>$ to generate a local address 72 in the main memory 14. The unaltered lower order address bits $<n-1:0>$ thus are used to select a storage location within a page 75 of the local address space 70 identified by the PFN field 54.

The information contained in MODE field 56 is provided to data path unit 80 as Mode signals over line 38. The Mode, byte-mask and write/read signals specify the configuration of data lines in data path unit 80 so that data bytes transferred from peripheral processor 24 are swapped and shifted, if necessary, prior to being stored in memory 14.

For example, data bytes on the remote bus 28 for transfer to the local bus 16 may be right-justified to low order byte positions. However, those data bytes should be positioned in the upper and middle order byte locations within a 4-byte longword on local bus 16. The hardware arrangement of adapter 30 rearranges the data bytes to the appropriate format on local bus 16 for storage in main memory 14. Accordingly, host processor 12 can access and interpret the data correctly.

The address translation and data byte swapping arrangement allows sharing of data between the host and peripheral processors in a fast and efficient manner. However, the hardware arrangement does not completely eliminate software intervention. Ideally, the application software should distinguish the data types in a mixed integer and ASCII character stream. That is, the application program should be developed in a manner that avoids mixing data types within a page so as to optimize the hardware arrangement. The arrangement according to the invention uses complete swapping of all the data types within a particular page or no swapping at all, depending upon the application. For example, if mixing cannot be avoided and a particular application can expect 80% ASCII character data and 20% integer data, then the format of the data types will not be swapped before the data is stored in main memory 14. The application software then directs the host processor 12 to individually swap the interspersed integer data types.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. In a data processing system including a first processor coupled to a first bus, said first processor configured to issue a first address that identifies a predetermined location in a main memory for storing a plurality of data bytes in a first format, and a second processor coupled to the main memory via a second bus, said second processor configured to issue a second address that identifies that predetermined location in main memory such that said second processor may access those data bytes in a second format, apparatus for converting the data bytes from said first format to said second format comprising:

a data path unit connecting said first bus to said second bus, said data path unit including first transceiver means for receiving the data bytes from said first bus in first positions of said first format and second transceiver means for transmitting the data bytes to said second bus in second positions of said second format for storage at the predetermined location in main memory; and a programmable mode register coupled to said first transceiver means and said second transceiver means via control line means, said programmable mode register having a first filed for storing format reconfiguration information used to control said first transceiver means and said second transceiver means such that the first positions of all of the data bytes received at said first transceivers may be transposed into the second positions at said second transceivers, thereby configuring said data path unit so that said second processor may access and correctly interpret the data bytes in said second format at the predetermined location in main memory.

2. The apparatus of claim 1 wherein said programmable mode register is contained within an address mapping unit coupled between said first bus and said second bus.

3. The apparatus of claim 2 wherein said programmable mode register further includes a second field for storing address translation information for translating said first address to said second address.

4. The apparatus of claim 3 further comprising means for specifying said programmable mode register.

5. The apparatus of claim 4 wherein said means for specifying comprises a first field of said first address.

6. The apparatus of claim 5 wherein said address translation information is concatenated to a second field of said first address to generate said second address.

7. The apparatus of claim 6 wherein said format reconfiguration information stored in said programmable mode register is provided by an application program.

* * * * *